United States Patent [19]
Langhorst

[11] 3,927,554
[45] Dec. 23, 1975

[54] BUMPER TEST DEVICE

[75] Inventor: Fred E. Langhorst, Birmingham, Mich.

[73] Assignee: General Motors Corporation, Detroit, Mich.

[22] Filed: July 1, 1974

[21] Appl. No.: 484,651

[52] U.S. Cl. .............................. 73/11; 116/114 AH
[51] Int. Cl.² ...................................... G01M 17/00
[58] Field of Search ......................... 73/11, 12, 492; 116/114 AH; 188/1 C, 268

[56] References Cited
UNITED STATES PATENTS

| | | | |
|---|---|---|---|
| 2,518,350 | 8/1950 | McCormick | 73/12 |
| 3,018,015 | 1/1962 | Agriss et al. | 188/1 C X |
| 3,469,439 | 9/1969 | Roberts et al. | 73/141 R X |
| 3,850,034 | 11/1974 | Tsuchiya et al. | 73/172 |

Primary Examiner—Charles A. Ruehl
Attorney, Agent, or Firm—Herbert Furman

[57] ABSTRACT

A bumper test device is provided with generally planar impact faces separated by an impact bar. Each face has a grid work of apertures in which tappet members are mounted for limited movement upon impact against the soft face of a motor vehicle. The tappet members are supported against movement under impact by a frangible indicating assembly which includes a lattice work of spaced horizontally extending base bars and vertically extending overlying bridging bars integrally molded therewith. An abutment element is integrally molded into the bridging bars intermediate each of the base bars to contact and support the tappet members. The test device is mounted on a conventional test pendulum. Upon impact of the impact bar against the soft face of the motor vehicle, the tappet members also engage the soft face and the bridging bars break adjacent the abutment elements if the impact load imposed upon a tappet member exceeds a predetermined level.

3 Claims, 7 Drawing Figures 3,927,554

BUMPER TEST DEVICE

The invention relates to a test device for testing motor vehicle bumpers.

Federal Motor Vehicle Safety Standard No. 215 establishes a test procedure for the impact resistance and the configuration of front and rear vehicle surfaces of a motor vehicle. MVSS 215 provides that the front and rear vehicle surfaces be impacted by a pendulum type test device and that during such impact the vehicle shall not be touched by the test device except on the ridge of an impact bar which is 4½ inches in height. The Standard also specifies the configuration of the impacting portion of the test device and generally provides for a plane designated A which is recessed three inches from the face of the impact ridge for specified distances above and below the impact ridge and a plane designated B which is in the plane of the impact ridge and begins six inches above the center line of the impact ridge. The surfaces of planes A and B cannot be touched by the vehicle during the impact test. The Standard also provides that an impact by the pendulum shall not impair the operation of certain specified vehicle systems such as lamps, the hood and the trunk lid.

This test procedure is used on conventional vehicle bumper systems in which rigid impact bumpers are mounted somewhat forwardly and rearwardly of the vehicle body panels by shock absorbing devices so that only the bumpers and not the body panels are contacted by the impact ridge of the device.

On the other hand, this test procedure and device is not appropriate for testing the impact resistance of a soft face motor vehicle such as the 1974 Corvette. Such a soft face vehicle employs a soft urethane impact face which covers a substantial area of the front of the vehicle and is contiguous with the body panels. Since the soft face envelops the impact ridge of the test device of MVSS 215, and contacts either or both the planes A and B, the test device of MVSS 215 is not entirely effective as a means of testing a soft face vehicle for compliance with the standard.

It is therefore desirable to provide a test device for such soft face vehicles which records the occurrence of an impact force in planes A and B in excess of a predetermined level.

The present invention provides such a test device having frangible indicating assemblies located in planes A and B and providing a recorded indication of the occurrence of an impact force in such planes which exceeds a preset level.

According to the present invention, the test device includes faces which simulate the planes A and B and are separated by an impact bar. A grid work of apertures is provided in such faces and tappet members are mounted therein for limited movement when they are impacted during the test procedure. These tappet members are supported against movement under impact by a frangible indicating assembly. The frangible indicating assembly is in the form of a lattice work of spaced horizontally extending base bars with vertically extending bridging bars overlaying the spaced base bars and integrally molded therewith. Interposed in the bridging bars intermediate each of the base bars is a frangible element including an abutment element which contacts and supports the tappet member against movement. The abutment elements are integrally molded in the bridging bars so that bridging portions of the bridging bars support the abutment element. The frangible indicating assembly is constructed of a brittle material such as injection molded polystyrene. Upon impact of the pendulum against the soft impact face of the motor vehicle, the faces of the test device are invariably contacted as the soft impact face of the vehicle envelops the impact bar. In the event that the impact load imposed upon a certain tappet member exceeds the capacity of the bridging portions associated with supporting abutment element, the bridging portions will break to provide a permanent record indicating that the impact force has exceeded a predetermined level.

Referring to the drawings, FIG. 1 is a perspective view of a conventional pendulum type test device having a frangible indicating assembly;

Figure 1:
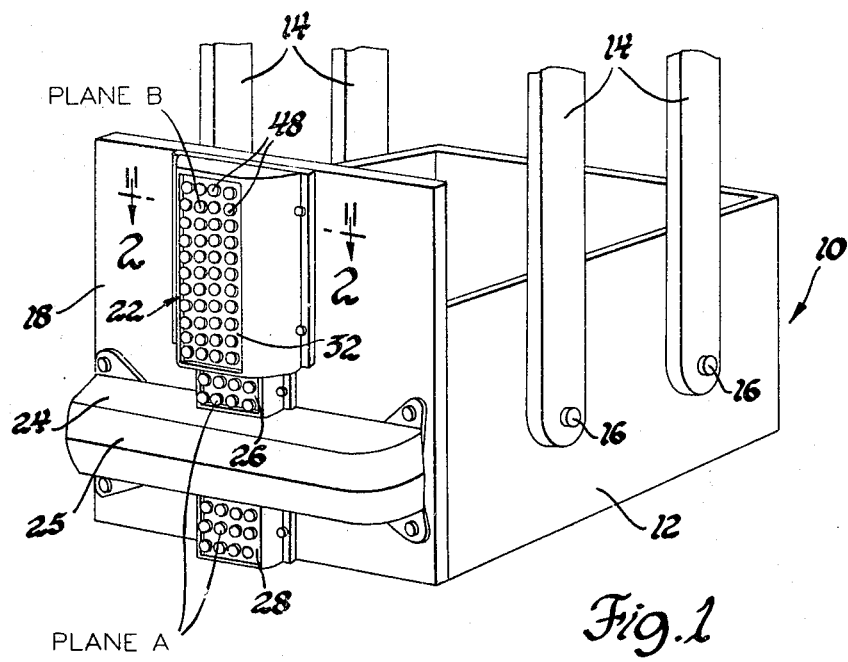

Referring to FIG. 1 a conventional pendulum type bumper test device is indicated generally at 10. The test device includes a box 12 supported by four links 14 which have their lower ends pivoted to the box 12 by pivots 16 and their upper ends, not shown, similarly pivoted to a support structure. Accordingly, the box 12 may be raised through an arcuate path to an elevated position and released to impart an impact load against a motor vehicle. The box 12 may be filled with weights to vary the impact force.

A support plate 18 is mounted on the front of the box 12 and mounts an impacting device indicated generally at 22. The impacting device has the configuration specified by MVSS 215 and includes a rigid steel impact bar 24 bolted to the support plate 18 and having an impact ridge 25. Impact faces 26 and 28 are located respectively above and below the impact bar 24 in the plane A as specified by MVSS 215. Plane A is recessed somewhat from the plane of impact ridge 25. An impact face 32 is located above the impact face 26 in the plane B as specified by MVSS 215. Impact faces 26, 28 and 32 each have a frangible indicating assembly associated therewith to indicate when the impact loading per unit area exceeds a predetermined maximum value which may be sustained during impact without impairment of vehicle systems.

Figure 2:
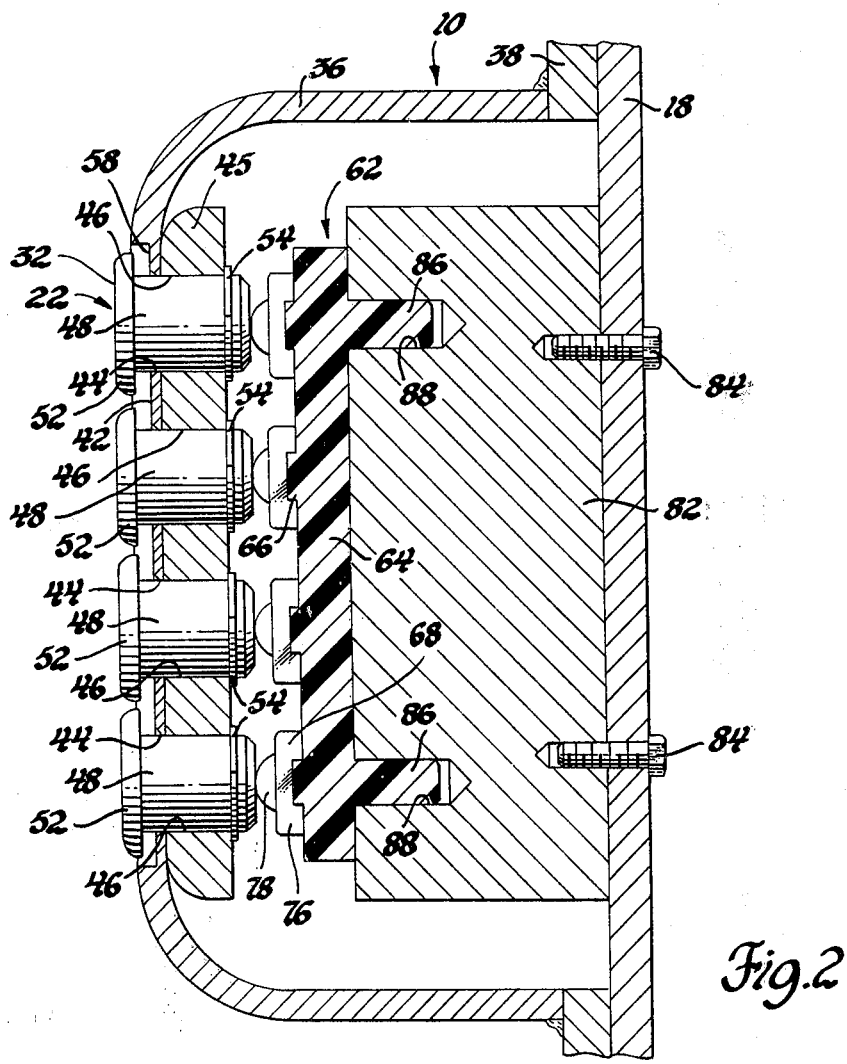
FIG. 2 is an enlarged sectional view taken in the direction of arrows 2—2 of FIG. 1.
Figure 3:
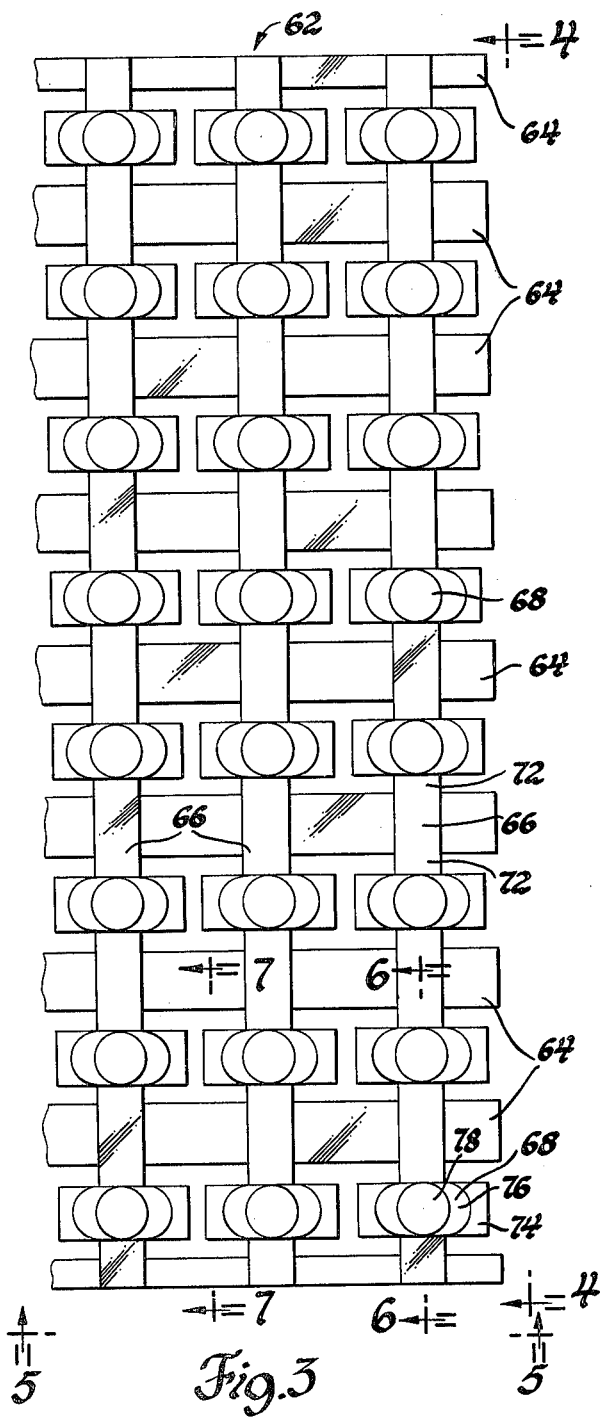
FIG. 3 is a front elevation view of the frangible indicating assembly.
Figure 4:
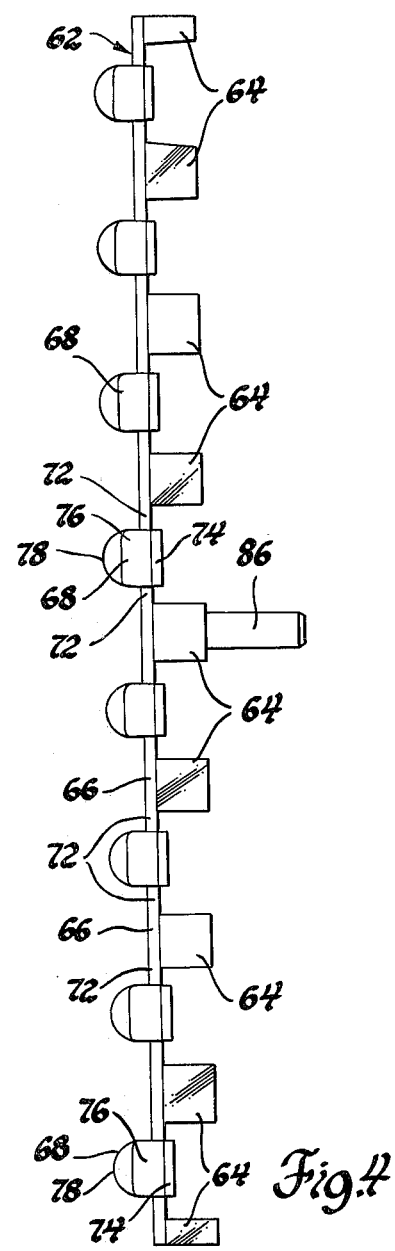
FIG. 4 is a side elevation view taken in the direction of arrows 4—4 of FIG. 3.
Figure 5:
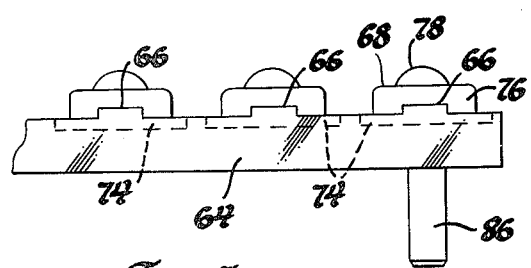
FIG. 5 is a view taken in the direction of arrows 5—5 of FIG. 3.
Figure 6:
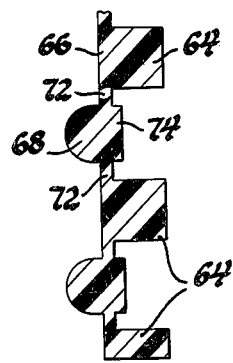
FIG. 6 is a sectional view taken in the direction of arrows 6—6 of FIG. 3.
Figure 7:
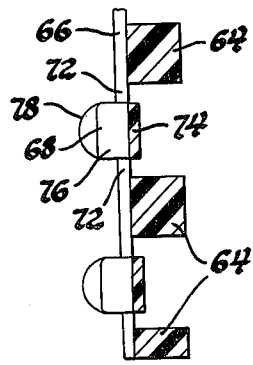
FIG. 7 is a sectional view taken in the direction of arrows 7—7 of FIG. 3.

Referring to FIG. 2, a cross-sectional view through the impact face 32 is shown, it being understood that the impact faces 26 and 28 are similarly constructed. As seen in FIG. 2, a housing 36 has a flange 38 welded to its base and this flange in turn is conventionally bolted to the support plate 18. The housing 36 has a face 42 having a plurality of rows and columns of circular openings 44 drilled therein. A reinforcement plate 45 is welded inside the housing 36 and has a plurality of circular openings 46 aligned with the circular openings 44 of the housing 36. A cylindrical tappet member 48 is located in each of the circular openings 44. Each tappet member 48 is retained for movement in its circular opening 44 by a flange 52 on the outer end of the tappet member 48 and a conventional retaining ring 54 seated in a circumferential groove on the inner end of the tappet member 48. A portion of the thickness of the housing 36 at the face 42 thereof is cut away at 58 sufficiently to permit limited longitudinal movement of the tappet members 48 relative the housing 36.

The tappet members 48 are backed up by a frangible indicating assembly indicated generally at 62 and seen in FIGS. 2 through 7. The frangible indicating assembly 62 includes horizontally extending spaced base bars 64 and vertically extending spaced bridging bars 66 which overlay and span the base bars 64 to form a lattice work. A plurality of abutment elements 68 are interposed in the bridging bars 66 intermediate the base bars 64 with the abutment elements 68 spaced somewhat from the base bars and connected thereto by bridging portions 72 of the bridging bars 66. The abutment elements 68 each have a rectangular base portion 74; a body portion 76 of elliptical shape and a spherical abutment 78 which extends into supporting contact with the inner end of the tappet members 48. The base bars 64, bridging bars 66 and abutment elements 68 are constructed as an integrally molded structure of injection molded polystyrene or equivalent brittle material. The base bars 64 of the frangible indicating assembly 62 are supported by a block 82, FIG. 2, which is attached to the support plate 18 by bolts 84. Cylindrical legs 86 extend from the base bars 64 into holes 88 of the block 82 to attach the frangible indicating assembly 62 on the block 82.

In operation, the motor vehicle to be tested is parked with its bumper aligned generally with the impact bar 24 and is restrained against movement as by being chained to the ground. The box 12 of the pendulum type test device 10 is filled with weights and raised to an elevation which will result in an impact against the vehicle which is equivalent to a specified mile per hour impact. The pendulum is then released with the result that the impact bar 24 is forcibly impacted against the vehicle bumper. In the case of a vehicle having a soft face consisting of a reinforced soft urethane impact surface, the impact bar 24 will be enveloped in the soft face of the motor vehicle. The impact faces 26, 28 and 32 in the planes A and B will invariably be contacted by the soft urethane impact face as it envelops the impact bar 24. This contacting force is applied against the tappet members 48 and in turn against the abutment elements 68 of the frangible indicating assembly 62. In the event that the impact load imposed upon a certain tappet member 48 exceeds the supporting capacity of the bridging portions 72, the bridging portions will break and the flange 52 on the outer end of the tappet member 48 will move into engagement with the cutaway portion 58 of the impact surface 42. The breaking of a particular one of the frangible abutment elements in this fashion provides a permanent record indicating that the impact force has exceeded a predetermined permissible load in that unit area of the soft face of the vehicle which is impacted by the tappet member associated with the broken abutment element.

If the impact bar 24 is impacted against the soft face of the motor vehicle without resulting in the breakage of any of the frangible elements of the frangible indicating assembly 62, it will be apparent that the impact loading upon the soft face has not exceeded the predetermined permissible load. Thus, by constructing the frangible indicating assembly 62 in such a manner that its frangible elements will be broken only at impact loads which are known to result in impairment of the operation of vehicle systems, a test pendulum for motor vehicle bumpers is provided which is effective to test the impact effectiveness of soft face motor vehicles as well as vehicles having conventional bumper systems.

The embodiments of the invention in which an exclusive property or privilege is claimed are defined as follows:

1. A device for testing a resilient impact receiving portion of a motor vehicle under simulated impact conditions comprising: a rigid impact bar for contacting a first area of the resilient portion of the motor vehicle to impart an impact force thereagainst, means for contacting a second area of the resilient portion of the motor vehicle adjacent the first area and including a plurality of force transmitting elements movable relative the rigid impact bar upon being contacted by the second area of the motor vehicle, and means including a plurality of discrete frangible elements supporting the plurality of force transmitting elements against movement and being individually broken when a predetermined impact force is applied thereagainst by the force transmitting means to thereby record the occurrence of such predetermined impact force.

2. In a bumper test device including a pendulum having a rigid impact bar for impacting a motor vehicle and additional generally planar impact surfaces arranged about the impact bar, the improvement comprising: a grid work of apertures in the planar surfaces, a plurality of tappet members, each tappet member being mounted for a limited movement in one of the apertures upon impact against the surface of a motor vehicle, a plurality of frangible elements, each frangible element being mounted behind one of the tappet members to support the tappet member against movement by the impact force upon impact with the motor vehicle surface, each frangible element being independently breakable when a predetermined impact force is applied thereagainst by the associated tappet member to indicate that an impact force in excess of a predetermined maximum has been received against the planar surface.

3. In a bumper test device including a pendulum having a rigid impact bar for impacting a motor vehicle and an additional generally planar impact surface arranged about the impact bar, the improvement comprising: a grid work of apertures in the planar surface, a plurality of tappet members each of which is mounted in one of the apertures for limited movement therein upon impact against the surface of a motor vehicle, and a frangible indicating assembly for supporting the tappet members against movement upon impact, said frangible indicating assembly including, a plurality of spaced base bars, a plurality of spaced bridging bars overlaying the spaced base bars to form a lattice work, a plurality of abutment elements interposed in the bridging bars intermediate the spaced base bars, one of said abutment elements being aligned with each of the tappet members to support the tappet members against movement by the impact force upon impact with the motor vehicle surface, the bridging bars being independently breakable when an impact force in excess of a predetermined level is applied against the associated abutment element by its associated tappet member whereby an indication is provided of an excessive impact force received against the planar surface.

* * * * *